INVENTORS
WILLY KADEN
ERICH FILSINGER
BY
Michael S. Striker
Attorney

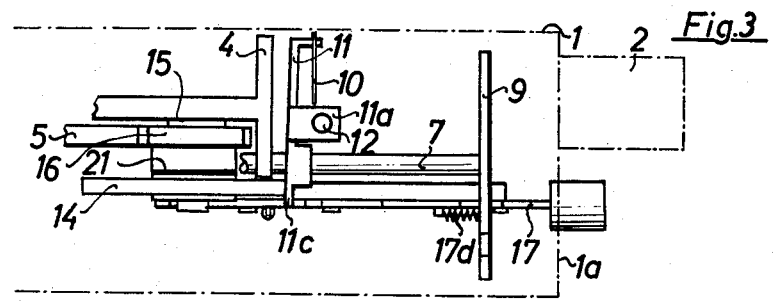
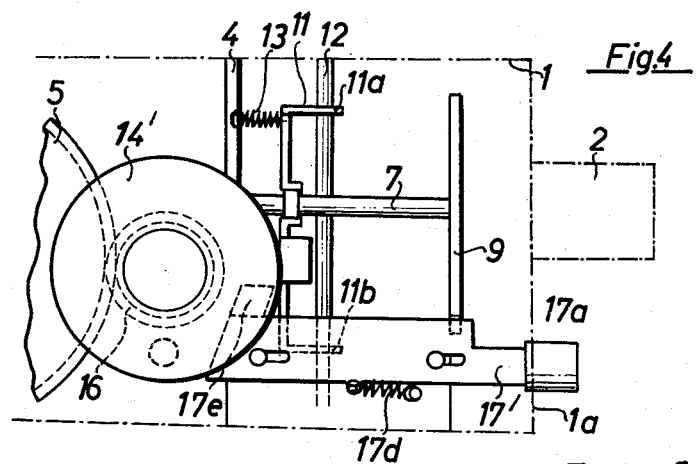
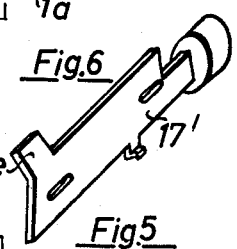
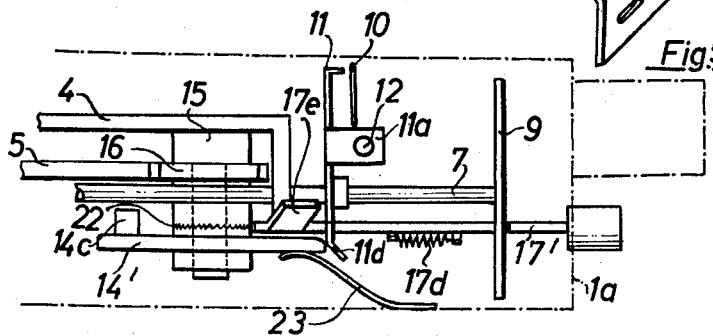
INVENTOR.
WILLY KADEN
ERICH FILSINGER

United States Patent Office 3,084,593
Patented Apr. 9, 1963

3,084,593
FILM STARTING AND STOPPING CONTROLS FOR CINEMATOGRAPHIC APPARATUS
Willy Kaden and Erich Filsinger, Munich, Germany, assignors to Agfa Aktiengesellschaft, Leverkusen-Bayerwerk, Germany
Filed Apr. 13, 1959, Ser. No. 805,874
Claims priority, application Germany Apr. 19, 1958
11 Claims. (Cl. 88—18.4)

The present invention relates to cinematographic apparatus.

With apparatus of this type there is provided a means for measuring the light and for automatically setting the exposure controlling structure of the camera, for example. Thus, a cinematographic camera may conventionally be provided with a light meter which is operatively connected to the diaphragm of the camera for automatically setting the latter in accordance with the prevailing light conditions.

Such a light meter does not start to operate until the camera operation is started by the operator, and consequently film will be transported and exposed during the relatively short period of time that the light meter registers the prevailing light conditions and acts on the diaphragm to set the latter. Thus, during this initial period of operation of the camera the film therein will be overexposed or underexposed, and 5 to 10 film frames may be improperly exposed in this way during the initial operation of the camera. Also, when the operator stops the operation of the camera, particularly a spring driven camera, during the period when the drive is decelerating the film is improperly exposed.

One of the objects of the present invention is to provide a cinematographic apparatus of the above type with a structure which will reliably prevent exposure of the film until after the light sensing device has had sufficient time to adjust the camera so as to make proper exposures.

Another object of the present invention is to provide in a cinematographic apparatus of the above type a structure which will prevent exposure of the film for a relatively short period of time after the apparatus has started to operate and which will also prevent exposure of the film for a relatively short period of time before the operation of the cinematographic apparatus stops.

Another object of the present invention is to provide a cinematographic apparatus in which the prevention of film exposure at least for a short period of time when the apparatus is started is carried out automatically upon actuation of the apparatus by the operator.

It is also an object of the present invention to provide an exceedingly simple and reliable structure capable of accomplishing the above objects.

With the above objects in view the present invention includes in a cinematographic camera which has exposure controlling structure as well as adjusting structure for automatically setting the exposure controlling structure, a film transporting claw, and a drive means for driving the claw. In accordance with the present invention a means is provided for preventing operation of the claw at the time when the apparatus is started through a period required for the exposure structure of the camera to be properly set, so that no film is exposed during this relatively short period of time when the operation is started and thus there will be no overexposed or underexposed film whenever the apparatus starts to operate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a schematic top plan view of the structure of FIG. 2;

FIG. 4 is a schematic side elevational view of another embodiment of the structure according to the present invention;

FIG. 5 is a schematic top plan view of the structure of FIG. 4; and

FIG. 6 is a perspective view of a manually operable member of the embodiment of FIGS. 4 and 5 which is actuated to start the operation of the cinematographic apparatus.

Figure 1:
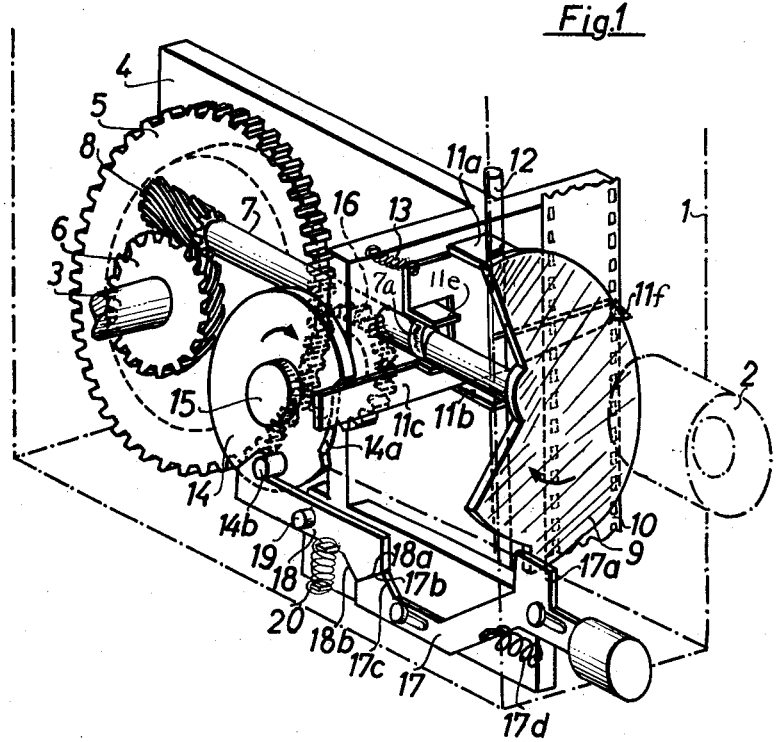
FIG. 1 is a perspective view of a cinematographic apparatus according to the present invention, FIG. 1 showing only enough structure to afford a complete understanding of the invention.

In FIGS. 1–5, there is shown the housing 1 and objective 2 of a motion picture camera, the housing and objective being diagrammatically shown in dot-dash lines for the sake of clarity. The same parts are indicated with the same reference characters in all figures. The camera is provided in a known way with a diaphragm which is adjustable so as to control the light entering the camera and with a structure which sets the diaphragm automatically at the proper value when the operation of the camera is started. For example, a light meter registers, when the operation is started, the amount of light and is linked to the diaphragm adjusting structure for automatically setting the aperture of the camera at the proper value. The details of the light meter, the diaphragm, and the connection therebetween are not necessary to an understanding of the invention and these parts are conventional. The camera also includes an unillustrated spring motor which is properly tensioned prior to operation of the camera. Only the driven shaft 3 of the spring motor is shown, this shaft 3 being shown in FIG. 1 turnably supported by a suitable support frame 4 which also supports the structure of the invention. The driven shaft 3 of the spring motor is fixedly connected with a gear 5 and a helical gear 6 which turns with the shaft 3 around the common axis of the elements 3, 5, and 6. The helical gear 6 meshes with a second helical gear 8 which is fixed to a shaft 7 so that the drive is transmitted from the shaft 3 through the gears 6 and 8 to the shaft 7 which is supported by the support frame 4 for rotation about its axis. At its end distant from the gear 8, the shaft 7 carries the rotary shutter disc 9 so that the latter is driven from the spring motor, the shutter 9 being located between the film 10 and the objective 2. The structure which guides and holds the film 10 is not illustrated for the sake of clarity, this structure not forming part of the present invention.

A film transporting means is provided for transporting the film 10 frame by frame and this film transporting means includes the claw 11 which is driven by the drive means formed by the elements 3 and 5–8. The claw 11 is provided with a pair of forwardly extending ears 11a and 11b, the latter being formed respectively with aligned openings through which the upright stationary shaft 12 freely passes so that the shaft 12, together with the ears 11a and 11b, support the claw 11 for turning movement about the axis of the shaft 12, as well as for movement axially up and down the shaft 12. The rotary shaft 7 carries a cam 7a which is located between a pair of forwardly extending portions of 11e the claw 11 to reciprocate the latter up and down along the shaft 12 during rotation of the shaft 7, and the claw 11 is also turned back and forth around the axis of the shaft 12, the structure which turns the claw 11 around the shaft 12 being omitted for the sake of clarity. The spring 13 is connected at one end to the frame 4 and at its opposite end to the claw 11 for urging the tooth 11f of the claw, this tooth being shown at the right end of the claw 11, as viewed in FIG. 1, in a perforation of the film strip. As is well known, the claw 11 is actuated to advance the next film frame to be exposed into the proper position while the shutter 9 is between the film and the objective, the film remaining stationary while an exposure is made, and the claw returning upwardly to its starting position ready to again engage the film for moving the next film frame into position as soon as an exposure has been completed. Thus, when the claw reaches its top position, the tooth thereof enters the film perforation, then the claw moves downwardly to advance the film, then the tooth of the claw moves out of the film perforation, the exposure is made, simultaneously the claw returns to its top position and its tooth again enters into a film perforation to repeat this cycle of operations. It is clear from FIGS. 1 and 3 that when the end 11c of the claw 11 opposite from the toothed end of the claw is turned forwardly toward the front wall of the camera, the tooth of the claw will be out of engagement with the film so that if the end 11c of the claw is maintained in this forward position, the claw will not engage the film and will not transport the same even though the claw continues to reciprocate along the shaft 12. Of course, the end 11c of the claw is maintained in this forwardmost position, preventing the claw from transporting the film, in opposition to the spring 13.

When, at the beginning of the operation of the camera, the spring motor is released so as to rotate the shaft 3 and the exposure controlling structure is also set into operation so as to adjust the diaphragm, the film transporting structure is prevented, in accordance with the present invention, from transporting the film for a relatively short period of time sufficient to permit the exposure controlling structure to become fully operative, although during this period of time, the spring motor is operating and the claw is reciprocating along the shaft 12, this period of time corresponding approximately to the amount of time required to make five to ten exposures. This result could be achieved, for example, by shifting the film for a short time at the start of the operation of the camera beyond the range of the claw. However, one of the features of the invention resides in achieving this result in a simpler way by maintaining the tooth of the claw, upon release of the spring motor, for a short period of time out of engagement with the film. The above-described film transporting structure provides several different possibilities for accomplishing this result and two specific solutions to the problem are described in detail below.

Figure 2:
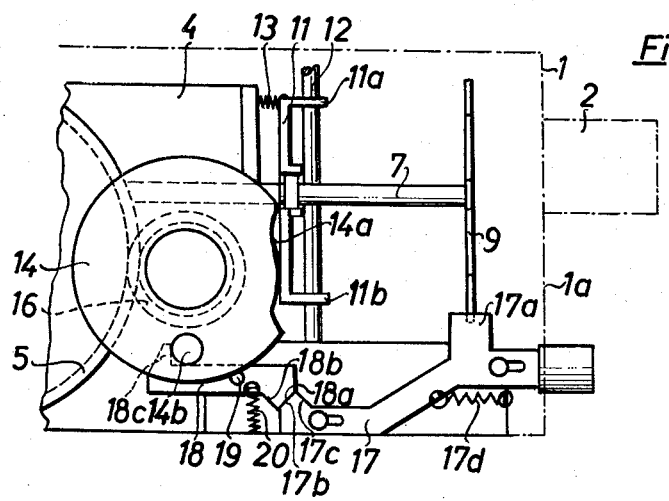
FIG. 2 is a schematic side elevational view of the structure of FIG. 1.

According to the embodiment of FIGS. 1–3, the structure for accomplishing this result includes a rotary disc 14 turnably supported by a shaft 15 which is parallel to the shaft 3 and which is fixedly carried by the frame 4. The shaft 15 turnably supports a gear 16 which meshes with the gear 5 so that the spring motor also drives the gear 16.

According to the embodiment of FIGS. 1–3, there is located on the shaft 15 between the gear 16 and the disc 14 a friction clutch 21, one part of which is fixed to the gear 16 and the other part of which is fixed to the disc 14, this friction clutch also being rotatably supported by the stationary shaft 15. Thus, when there is no force resisting turning of the disc 14 on the shaft 15, the disc 14 will rotate with the gear 16, the drive being transmitted from the gear 16 to the disc 14 through the friction clutch 21. However, when the disc 14 is prevented from turning, then the gear 16 will continue to turn and the clutch will slip.

The disc 14 has a peripheral camming edge which extends along a circle and which cooperates with the end portion 11c of the claw 11 to maintain this end portion 11c in its forward position described above preventing the tooth of the claw from engaging the film, so that the disc 14 forms a cam means for preventing the film transporting means from transporting the film. The disc 14 is formed along a portion of its periphery with a cutout 14a which, when it is in registry with the end portion 11c of the claw, provides a space in which the end portion 11c of the claw can freely move so that the film can be transported in the usual manner, and it will be noted from FIGS. 1 and 2 that the cutout 14a extends angularly around the axis of disc 14 through a distance sufficient to provide free vertical, as well as lateral movement of the claw through its entire cycle of operation. Thus, when the end portion 11c of the claw can enter into the cutout 14a, the claw can engage the film and the latter will be transported. If, however, the disc 14 turns so as to place its outer circular peripheral edge in engagement with the claw, the latter cannot transport the film.

The camera includes a manually operable member 17 which is shifted by the operator inwardly toward the interior of the camera for starting the latter in a known way. This shiftable release member 17 is formed with a plurality of slots through which stationary pins extend for guiding the member 17 for movement inwardly to the camera operating position and outwardly to the camera stopping position. Thus, when the operator moves the element 17 toward the rear wall of the camera, the spring motor will be released in a known way to start the operation of the camera, and thus the gear transmission 7, 8, 6, 3, will start to operate. The exposure controlling structure is set into operation by the spring motor so that the exposure controlling structure also starts to operate when the release member 17 is actuated by the operator. When the operator releases the member 17, the latter is returned to its rest position by the spring 17d. When the member 17 is in its rest position, a projection 17a thereof engages a shoulder at the periphery of the shutter 9 to prevent rotation of the latter, while when the operator shifts the release member 17 toward the rear in opposition to the spring 17d, the projection 17a will be displaced away from the plane of the shutter 9 to release the latter for rotation. At its end opposite from its outer exposed end which is accessible to the operator, the release member 17 is provided with a pair of oppositely inclined surfaces 17b and 17c which intersect to provide the member 17 with a pointed portion, the edge 17b engaging an edge 18a of a lever 18 in the rest position of member 17 illustrated in FIGS. 1 and 2. The lever 18 is turnable about a stationary pivot 19 carried by the frame 4, for example, and the spring 20 urges the lever 18 in a clockwise direction, as viewed in FIG. 2. The lever 18 is provided with an edge 18b inclined oppositely to and intersecting the edge 18a to provide the lever 18 with a pointed portion which cooperates with the pointed portion of the member 17. The end of lever 18 on the side of pivot 19 opposite from the pointed portion 18a, 18b, of the lever 18 is provided with a projection 18c located in the path of turning movement of a projection 14b carried by the disc 14 for rotation therewith. Thus, in the position of the parts shown in FIGS. 1 and 2 where the projection 18c engages the projection 14b, the disc 14 is prevented from turning and the clutch 21 slips. It will be noted that the angular position of the projection 14b locates the cutout 14a in registry with the end 11c of the claw 11 when the stop 18c engages the projection 14b.

When the operator shifts the release member 17 to the left, as viewed in FIGS. 1 and 2, to start the camera, the surface 17b slides along the surface 18a and turns the lever 18 in opposition to the spring 20 in a counterclockwise direction around the pivot 19, as viewed in FIGS. 1 and 2, so that the stop 18c moves out of the path of turning movement of the projection 14b so that the disc 14 is driven through the slip clutch 21 and the gears 5 and 16 upon rotation of the shaft 3 by the spring of the spring motor. Thus, the cutout 14a is turned out of registry with the end portion 11c of the claw 11 and the circular edge of the disc 14 maintains the claw 11 at an angular position with respect to the axis of the shaft 12 where the tooth of the claw is maintained rearwardly of and out of engagement with the film 10.

When the release plunger 17 has been shifted all the way into its final operating position, the surface 17c of element 17 is in engagement with the surface 18b of the lever 18 so that the latter has returned to the position shown in FIGS. 1 and 2 and thus the projection 18c is again in the path of movement of the projection 14b. Thus, the disc 14 will continue to turn until its projection 14b engages the stop projection 18c, and then the clutch will slip since the disc 14 cannot turn further, and the cutout 14a will register with the claw to allow free operation of the latter, so that the film is now transported. The time required for the above-described structure to turn the camming disc 14 through one revolution so as to prevent film transportation during this time, corresponds to the time required for the light controlling structure of the camera to become fully operative so as to set the camera to make proper exposures.

It will be noted that when the plunger 17 is released by the operator to be returned by the spring 17d back to its rest position, the lever 18 will again be turned so as to release the disc 14 to the drive, and thus, with the structure of the invention, the transportation of the film is also stopped shortly before the operation of the camera stops, and thus, improper exposures cannot be made during stopping of the camera. At this time, the surface 17c slides to the right as viewed in FIGS. 1 and 2 along the surface 18b and then after the crests of the pointed portions of elements 17 and 18 pass over each other, the surfaces 17b and 18a slide along each other until the parts are again in the position shown in FIGS. 1 and 2.

The second embodiment of the invention illustrated in FIGS. 4–6 differs from that described above mainly in that the peripheral camming edge of the disc 14' extends uninterruptedly through an entire circle and in that, instead of a slip clutch, the gear 16 transmits the drive to the disc 14' through a toothed clutch 22 which releasably places the gear 16 and the disc 14' in driving engagement with each other. The lever 18 is omitted in the embodiment of FIGS. 4–6. The manually operable release means 17' of FIGS. 4–6 is provided with an inclined tongue 17e which, when the release member 17' is in its inner operating position, is in the path of turning movement of a projection 14c of the disc 14' so that this projection 14c rides along the upwardly facing inclined surface of the tongue 17e and thus this tongue shifts the camming disc 14' axially along the shaft 15 in opposition to the spring 23 away from the gear 16 to disengage the clutch 22. Only when the clutch 22 is engaged is the peripheral edge of disc 14' in engagement with the end portion 11d of the claw 11 to prevent the latter from transporting the film. The spring 17d in the embodiment of FIG. 4 also urges the member 17' back to its rest position, this member being guided for movement by a pin and slot mounting as described above in connection with FIGS. 1–3. Thus, with this embodiment of the invention, when the camera is started the spring motor will, through the above-described gearing, rotate the camming disc 14' through approximately one revolution until its projection 14c engages the tongue 17e so as to automatically disengage the clutch 22 and until the clutch is disengaged, the film transporting means 11 cannot transport the film. During the normal operation of the camera, the projection 14c remains in engagement with the member 17'. When the latter is released by the operator, it is returned by the spring 17d to its rest position, thus freeing he disc 14' to the influence of the leaf spring 23 shown in FIG. 5 so that the latter shifts the disc 14' back along the shaft 15 to engage the clutch 22 and to prevent further operation of the claw, so that with this embodiment also, the film transportation is prevented shortly before the camera stops. As was pointed out above, as long as the clutch 22 is engaged, the peripheral camming edge of the disc 14' will locate the end portion 11d of the claw 11 sufficiently near to the front wall of the camera to prevent the tooth of the claw from engaging the film throughout the entire range of vertical movement of the claw, and the same is true of the embodiment of FIGS. 1 and 2 where the outer circular edge of the camming disc 14 maintains the claw out of engagement with the film during the entire range of vertical reciprocation of the claw.

Although reference has been made above to a camera where the exposure controlling structure is set into operation by the spring motor, it is apparent that the structure of the invention is also capable of being used with those cameras where the exposure controlling structure is set into operation independently of but simultaneously with the spring motor. The structure of the invention provides a predetermined delay in the starting of the film transportation after the camera operation is started, and this delay corresponds to the time required for the exposure controlling structure to become fully operative.

It will be understood that each of the elements described above, or two or more together, may also find a useful application in other types of cameras differing from the types described above.

While the invention has been illustrated and described as embodied in camera controls, it is not intended to be limited to the details shown, since various modifications and structural changes may be made without departing in any way from the spirit of the present invention.

The structure of the invention is equally usable in any motion picture camera even if it were not provided with an automatic exposure controlling structure. The structure of the invention will provide the additional advantage of permitting the moving parts of the camera to accelerate up to their normal operating speed so as to prevent exposures from being made until all of the moving parts are moving at their proper speed and, in this way, overexposures resulting from rotation of the shutter at less than its normal operating speed is avoided. In the same way, overexposures are prevented when the camera is stopped during the period of deceleration of the moving parts. These advantages are entirely independent of the exposure controlling structure and are of general applicability. With these advantages, the invention becomes usable also in projectors which will not start to transport the film of the projector until the moving projector parts have attained their normal operating speed.

What is claimed as new and desired to be secured by Letters Patent is:

1. In a cinematographic camera, in combination, a film transporting claw; drive means operatively connected to said claw for driving the same; manually operable means cooperating with said drive means for starting and stopping the same at the will of the operator; and means actuated by said manually operable means and automatically cooperating with said claw, in response to operation of said manually operable means by the operator to start said drive means, for maintaining said claw out of engagement with the film for a short period of time after the drive means has started to operate so that the film is not transported and thus is not exposed during said short period of time.

2. In a cinematographic apparatus as recited in claim 1, said means for maintaining said claw out of engagement with the film including a rotary cam having an uninterrupted peripheral circular camming edge engaging said claw to maintain the latter out of engagement with the film, said drive means cooperating also with said cam for driving said cam, and said manually operable means cooperating with said cam for shifting the latter out of driving engagement with said drive means shortly after the drive means has started to operate.

3. In a cinematographic apparatus as recited in claim 1, said drive means including a first gear and said means for maintaining said claw out of engagement with the film including a rotary cam having a peripheral edge which when it engages said claw prevents the latter from transporting film, said rotary cam being fixed to a second gear, support means supporting said rotary cam for axial shifting movement to and from a position where said second gear meshes with said first gear, and said manually operable means cooperating with said cam for shifting the latter and said second gear away from said first gear after said cam has been rotated by said drive means through approximately one revolution.

4. In a cinematographic apparatus as recited in claim 3, a projection fixed to said cam for rotation therewith, said manually operable means having an inclined surface along which said projection rides for shifting said cam and said second gear away from said first gear.

5. In a cinematographic camera, in combination, a film transporting claw; drive means operatively connected to said claw for driving the same; manually operable means cooperating with said drive means for starting and stopping the same at the will of the operator; and means actuated by said manually operable means and automatically cooperating with said claw, in response to operation of said manually operable means by the operator to start said drive means and in response to operation of said manually operable means by the operator to stop said drive means, for maintaining said claw out of engagement with the film for a short period of time after said drive means has started to operate and for a short period of time before said drive means stops operating so that film is not transported and thus is not exposed during both of said short periods of time.

6. In a cinematographic camera, in combination, a film transporting claw; drive means operatively connected to said claw for driving the same; cam means having a camming portion which when it engages said claw maintains the latter out of engagement with the film to prevent transportation of the latter; support means supporting said cam means for movement between a first position where said camming portion engages said claw and a second position where said camming portion is out of engagement with said claw; manually operable means cooperating with said drive means for starting and stopping the same at the will of the operator; and means actuated by said manually operable means and cooperating with said cam means, in response to operation of said manually operable means by the operator to start said drive means, for automatically maintaining said cam means in said first position thereof for a short period of time after said drive means has started to operate and for then placing said cam means in said second position thereof, whereby film will not be transported and thus will not be exposed during said short period of time.

7. In a cinematographic camera, in combination, a film transporting claw; drive means cooperating with said claw for driving the same; cam means having a camming portion which when it engages said claw maintains the latter out of engagement with the film to prevent transportation of the latter; support means supporting said cam means for movement between a first position where said camming portion thereof engages said claw and a second position where said camming portion thereof is out of engagement with said claw; manually operable means cooperating with said drive means for starting and stopping the same at the will of the operator; and means actuated by said manually operable means and automatically maintaining said cam means, in response to opertion of said manually operable means by the operator for starting said drive means, in said first position thereof for a short period of time after said drive means has started to operate, for then placing said cam means in said second positon thereof, and, in response to operation of said manually operable means by the operator for stopping said drive means, for returning said cam means to said first position thereof shortly before said drive means stops operating, so that film will not be transported and thus will not be exposed during said short period of time after said drive means has started to operate as well as shortly before said drive means stops operating.

8. In a cinematographic camera, in combination, a film transporting claw; drive means cooperating with said claw for driving the same; a rotary cam having a circular peripheral edge and formed in its peripheral edge with a cutout so that said circular peripheral edge extends through less than 360°, said circular peripheral edge of said cam engaging said claw to prevent the latter from engaging the film and said claw when it is in register with said cutout cooperating normally with the film to transport the same, said drive means being operatively connected to said cam for rotating the latter; manually operable means cooperating with said drive means for starting and stopping the same at the will of the operator; and means actuated by said manually operable means and automatically limiting said rotary cam, in response to operation of said manually operable means by the operator for starting said drive means, to approximately one revolution from a starting position where said claw extends into said cutout to an end position where said claw also extends into said cutout when the operation of the cinematographic camera is started, whereby during the time required for said cam to turn through one revolution film will not be transported and thus will not be exposed.

9. In a cinematographic apparatus, in combination, a film transporting claw; pivot means supporting said claw for pivotal turning movement at one end thereof into and out of engagement with the film, said claw having a free end portion distant from said one end thereof; a rotary cam having a peripheral circular edge which engages said free end portion of said claw to maintain said one end thereof out of engagement with the film, said cam being formed with a cutout which when it is in registry with said free end portion of said claw frees the latter for normal operation; drive means operatively connected to said claw for operating the same; slip clutch means connecting said drive means to said rotary cam for rotating the latter; a projection carried by said cam for rotation therewith; a lever turnable to and from a position in the path of movement of said projection to prevent rotation of said cam; and a manually operable member shiftable for starting the operation of the cinematographic apparatus, said member being shifted upon starting of the apparatus in a direction which locates said lever momentarily out of the path of said projection so as to release said rotary cam for rotation through approximately one revolution by said drive means.

10. In a cinematographic apparatus, in combination, a film transporting claw; pivot means supporting said claw for pivotal turning movement at one end thereof into and out of engagement with the film, said claw having a free end portion distant from said one end thereof; a rotary cam having a peripheral circular edge which engages said free end portion of said claw to maintain said one end thereof out of engagement with the film, said cam being formed with a cutout which when it is in registry with said free end portion of said claw frees the latter for normal operation; drive means operatively connected to said claw for operating the same; slip clutch means connecting said drive means to said rotary cam for rotating the latter; a projection carried by said cam for rotation therewith; a lever having an engaging portion located in the path of movement of said projection to prevent rotation of said cam and having distant from said engaging portion a camming portion, said lever being turnable to and from said position in which said engaging portion is located in the path of movement of said projection; and a manually operable member shiftable in one direction for starting the operation of the cinematographic apparatus and having a camming portion cooperating with said camming portion of said lever during shifting of said member in said one direction so as to turn said lever from said position in which said engaging portion is located in the path of movement of said projection so as to release said rotary cam for rotation through approximately one revolution by said drive means.

11. In a cinematographic apparatus, in combination, a film transporting claw; pivot means supporting said claw for pivotal turning movement at one end thereof into and out of engagement with the film, said claw having a free end portion distant from said one end thereof; a rotary cam having a peripheral circular edge which engages said free end portion of said claw to maintain said one end thereof out of engagement with the film, said cam being formed with a cutout which when it is in registry with said free end portion of said claw frees the latter for normal operation; drive means operatively connected to said claw for operating the same; slip clutch means connecting said drive means to said rotary cam for rotating the latter; a projection carried by said cam for rotation therewith; a lever having an engaging portion located in the path of movement of said projection to prevent rotation of said cam and having distant from said engaging portion a pair of oppositely inclined camming surfaces, said lever being turnable to and from said position in which said engaging portion is located in the path of movement of said projection; a manually operable member shiftable for starting the operation of the cinematographic apparatus from a first end position in one direction to a second end position and back to said first end position for stopping operation of the apparatus, said manually operable member having a pair of oppositely inclined camming surfaces and one of said camming surfaces of said member engages one of said camming surfaces of said lever when said member is in the first end position so as to keep said engaging portion of said lever in the path of movement of said projection and said engaging camming surfaces cooperating during movement of said member in said one direction to turn said lever so as to move said engaging portion out of the path of movement of said projection and the other of said camming surfaces of said member engaging the other camming surface of said lever when said member is in said second end position, said other camming surface of said member cooperating with said other of camming surface of said lever during movement of said member from said first to said second end position so as to keep said engaging portion out of the path of movement of said projection; and spring means operatively connected to said lever and tending to keep the same in the position in which said engaging portion thereof is located in the path of movement of said projection.

References Cited in the file of this patent

UNITED STATES PATENTS

| | | |
|---|---|---|
| 1,871,335 | Merle | Aug. 9, 1932 |
| 2,058,483 | Mihalyi | Oct. 27, 1936 |
| 2,097,220 | Blum | Oct. 26, 1937 |

FOREIGN PATENTS

| | | |
|---|---|---|
| 316,257 | Great Britain | June 12, 1930 |
| 594,084 | Great Britain | Nov. 3, 1947 |